(12) United States Patent
Petridis et al.

(10) Patent No.: US 10,131,344 B2
(45) Date of Patent: Nov. 20, 2018

(54) SYSTEM AND METHOD FOR CONTROLLING HYBRID VEHICLE

(71) Applicant: FORD GLOBAL TECHNOLOGIES, LLC, Dearborn, MI (US)

(72) Inventors: Anthemios Philemon Petridis, Bishop's Stortford (GB); Nicholas Dashwood Crisp, Benfleet (GB); Khizer Tufail, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/049,533

(22) Filed: Feb. 22, 2016

(65) Prior Publication Data
US 2016/0244049 A1  Aug. 25, 2016

(30) Foreign Application Priority Data
Feb. 20, 2015 (GB) .................................. 1502883.0

(51) Int. Cl.
*B60W 20/30* (2016.01)
*B60W 20/19* (2016.01)
(Continued)

(52) U.S. Cl.
CPC ............. *B60W 20/30* (2013.01); *B60K 6/485* (2013.01); *B60W 10/06* (2013.01); *B60W 10/08* (2013.01);
(Continued)

(58) Field of Classification Search
CPC ...... B60W 20/30; B60W 10/11; B60W 10/08; B60W 20/19; B60W 2510/244;
(Continued)

(56) References Cited

U.S. PATENT DOCUMENTS

| 5,954,781 A | * | 9/1999 | Slepian ................. B60K 28/00 340/425.5 |
| 8,504,229 B2 | | 8/2013 | Sandstrom et al. |

(Continued)

FOREIGN PATENT DOCUMENTS

DE  102009025690 A1  12/2010

OTHER PUBLICATIONS

Great Britain Search Report for Great Britain Application No. 1502883.0 dated Jul. 30, 2015.

*Primary Examiner* — Mussa A Shaawat
*Assistant Examiner* — Michael V Kerrigan
(74) *Attorney, Agent, or Firm* — David B. Kelley; Brooks Kushman P.C.

(57) ABSTRACT

A hybrid vehicle and method for reducing fuel consumption include upper and lower engine speed limits set based upon whether the state of charge of a battery electrically connected to an electric machine, which may be implemented by an integrated starter-generator is sufficiently high to permit the electric machine to provide a temporary torque boost to an engine of the motor vehicle. If the state of charge of the battery is sufficiently high to permit temporary torque boosting, then the upper and lower engine speed limits are reduced from baseline upper and lower limits to adjusted upper and lower limits to reduce fuel consumption of the engine without adversely affecting NVH.

20 Claims, 3 Drawing Sheets

(51) Int. Cl.
*B60W 10/11* (2012.01)
*B60W 10/08* (2006.01)
*B60K 6/485* (2007.10)
*B60W 10/06* (2006.01)

(52) U.S. Cl.
CPC ............ *B60W 10/11* (2013.01); *B60W 20/19* (2016.01); *B60W 2510/244* (2013.01); *Y02T 10/6226* (2013.01); *Y02T 10/6286* (2013.01); *Y10S 903/93* (2013.01); *Y10S 903/945* (2013.01)

(58) Field of Classification Search
CPC . B60W 2510/0638; B60W 2710/1005; B60W 2710/083; Y02T 10/6286; Y10S 903/93; Y10S 903/945
See application file for complete search history.

(56) References Cited

U.S. PATENT DOCUMENTS

| | | | |
|---|---|---|---|
| 8,744,716 B2 | 6/2014 | Kar et al. | |
| 8,771,136 B2 | 7/2014 | Miller et al. | |
| 8,965,650 B1* | 2/2015 | Otanez | B60W 20/30 701/22 |
| 2006/0030452 A1* | 2/2006 | Tsukada | B60K 6/48 477/37 |
| 2013/0297162 A1 | 11/2013 | Dai et al. | |
| 2014/0257653 A1 | 9/2014 | Sato et al. | |

* cited by examiner

SYSTEM AND METHOD FOR CONTROLLING HYBRID VEHICLE

CROSS-REFERENCE TO RELATED APPLICATIONS

This application claims foreign priority benefits under 35 U.S.C. § 119(a)-(d) to GB 1502883.0 filed Feb. 20, 2015, which is hereby incorporated by reference in its entirety.

TECHNICAL FIELD

This disclosure relates to a hybrid vehicle and method for reducing fuel consumption using an integrated starter generator.

BACKGROUND

It is known to provide a motor vehicle with an electric machine that can be operated as an electric motor or as an electric generator. One such device is an integrated starter-generator that can be used as a motor to temporarily provide a torque boost to an engine to which it is driveably connected. One type of integrated starter-generator is a crankshaft integrated starter-generator (CISG) directly driving a crankshaft of an engine and another type of integrated starter-generator is a belt integrated starter-generator (BISG) driven by a belt, such as a front end accessory drive (FEAD) belt, that can also add torque to a crankshaft of the engine via the FEAD belt. The use of a CISG/ BISG to provide a torque boost to the engine results in a motor vehicle sometimes referred to as a "hybrid vehicle." With a hybrid vehicle, the CISG/ BISG is not used to directly drive the motor vehicle on its own unlike the electric motor or motors used in a full hybrid vehicle. With a hybrid vehicle, a CISG/ BISG is used to provide a torque boost to the engine and for starting the engine.

A known method to improve fuel economy at the expense of low end torque performance is the lengthening of the transmission Final Drive Ratio (FDR). However, there is a limit to the amount of torque reduction that is acceptable while maintaining good driveability. Furthermore, an NVH (Noise Vibration Harshness) mode known as lugging caused by impulsive inputs due to delivering high combustion torques can be induced if too much torque is requested at low engine speeds when the gear ratio is too high. Upshift and Downshift decisions are therefore normally based on the maximum torque available at any given time to ensure good driveability and good NVH.

SUMMARY

The inventors have realized that, in the case of a hybrid motor vehicle, where propulsive torque from an internal combustion engine can be combined with propulsive torque from an electric machine in the form of a motor, it is possible to lengthen the FDR more than would be possible for a non-hybrid application. This is because the secondary source of torque from the motor can be used to augment the torque of the engine at low engine speeds hence avoiding the problems of too little torque and associated engine lugging.

According to a first aspect, a method for reducing the fuel consumption of a hybrid vehicle having an engine drivingly connected to a multi-speed transmission and an electric machine driveably connected to the engine and electrically connected to a battery includes setting an engine speed limit used for establishing when a change in ratio of the transmission would be beneficial in order to optimize the fuel consumption of the engine based upon the state of charge of the battery. The engine speed limit may be set based upon whether the state of charge of the battery is sufficient to permit the electric machine to be used to provide a temporary torque boost to the engine. If the state of charge of the battery is sufficient to permit the electric machine to be used to provide a temporary torque boost to the engine, the engine speed limit may be set lower than if the state of charge of the battery is insufficient to permit the electric machine to be used to provide a temporary torque boost to the engine.

The method may further comprise setting a first baseline engine speed limit if the state of charge of the battery is insufficient to permit the electric machine to be used to provide a temporary torque boost to the engine and a second lower adjusted engine speed limit if the state of charge of the battery is sufficient to permit the electric machine to be used to provide a temporary torque boost to the engine.

The method may further comprise setting a state of charge threshold for the battery and testing whether the current state of charge of the battery is greater than the state of charge threshold and, if the current state of charge of the battery is greater than the state of charge threshold, inferring that the state of charge of the battery is sufficient to permit the electric machine to be used to provide a temporary torque boost to the engine.

The electric machine may be an integrated starter-generator. The change in ratio of the transmission may be an upshift to a higher gear and the engine speed limit may be an engine upper speed limit for the engine when using the current gear ratio. The upper engine speed limit may be an engine speed that will result in a satisfactory engine speed in terms of fuel economy and NVH when the ratio of the transmission is changed to the next higher gear.

If the transmission is a transmission in which the driver manually effects changes in gear ratio and the current engine speed is one of equal to and greater than the currently set engine upper speed limit, then the method may further comprise providing an alert to a user of the motor vehicle that an upshift is required. Alternatively, if the transmission is a fully automatic transmission in which changes in gear ratio are made automatically and the current engine speed is one of equal to and greater than the currently set engine upper speed limit, then the method may further comprise automatically shifting the transmission into a higher gear.

The change in ratio of the transmission may be a downshift to a lower gear and the engine speed limit may be an engine lower speed limit for the engine when using the current gear ratio. The engine lower speed limit may be an engine speed below which the engine speed is not satisfactory in terms of fuel economy and NVH.

If the transmission is a transmission in which the driver manually effects changes in gear ratio and the current engine speed is one of equal to and less than the currently set engine lower speed limit, the method may further comprise providing an alert to a user of the motor vehicle that a downshift is required. Alternatively, if the transmission is a fully automatic transmission in which changes in gear ratio are made automatically and the current engine speed is one of equal to and less than the currently set engine lower speed limit, then the method may further comprise automatically shifting the transmission into a lower gear.

According to a second aspect, a hybrid vehicle having an engine drivingly connected to a multi-speed transmission, an electric machine drivingly connected to the engine and electrically connected to a battery includes a control system operable to set an engine speed limit used for establishing when a change in ratio of the transmission would be beneficial in order to optimize the fuel consumption of the engine based upon the state of charge of the battery. The control system may be operable to set the engine speed limit based upon whether the state of charge of the battery is sufficient to permit the electric machine to be used to provide a temporary torque boost to the engine. The control system may be further operable to set and use a first baseline engine speed limit if the state of charge of the battery is insufficient to permit the electric machine to be used to provide a temporary torque boost to the engine and to set and use a second adjusted engine speed limit if the state of charge of the battery is sufficient to permit the electric machine to be used to provide a temporary torque boost to the engine.

The change in ratio of the transmission may be an upshift to a higher gear and the engine speed limit may be an engine upper speed limit for the engine when using the current gear ratio. The upper engine speed limit may be an engine speed that will result in a satisfactory engine speed in terms of fuel economy and vibration harshness when the ratio of the transmission is changed to the next higher gear.

The transmission may be a transmission in which the driver manually performs changes in gear ratio and, when the current engine speed is one of equal to and greater than the currently set engine upper speed limit, the control system may be operable to provide an alert to a user of the motor vehicle that an upshift is required. Alternatively, the transmission may be a fully automatic transmission in which changes in gear ratio are made automatically and, when the current engine speed is one of equal to and greater than the currently set engine upper speed limit, the control system may automatically shift the transmission into a higher gear.

The change in ratio of the transmission may be a downshift to a lower gear and the engine speed limit may be an engine lower speed limit for the engine when using the current gear ratio. The engine lower speed limit may be an engine speed below which the engine speed is not satisfactory in terms of fuel economy and NVH.

The transmission may be a transmission in which the driver manually performs a change in gear ratio and, when the current engine speed is equal to and less than the currently set engine lower speed limit, the control system may provide an alert to a user of the motor vehicle that a downshift is required. The alert may be at least one of a visual alert, a haptic signal and an audible alert. Alternatively, the transmission may be a fully automatic transmission in which changes in gear ratio are made automatically and, when the current engine speed is one of equal to and less than the currently set engine lower speed limit, the control system may automatically shift the transmission into a lower gear.

The electric machine may be an integrated starter-generator, such as a belt integrated starter-generator driveably connected via a drive belt to a crankshaft of the engine.

One or more embodiments will now be described by way of example with reference to the accompanying drawing of which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1A:
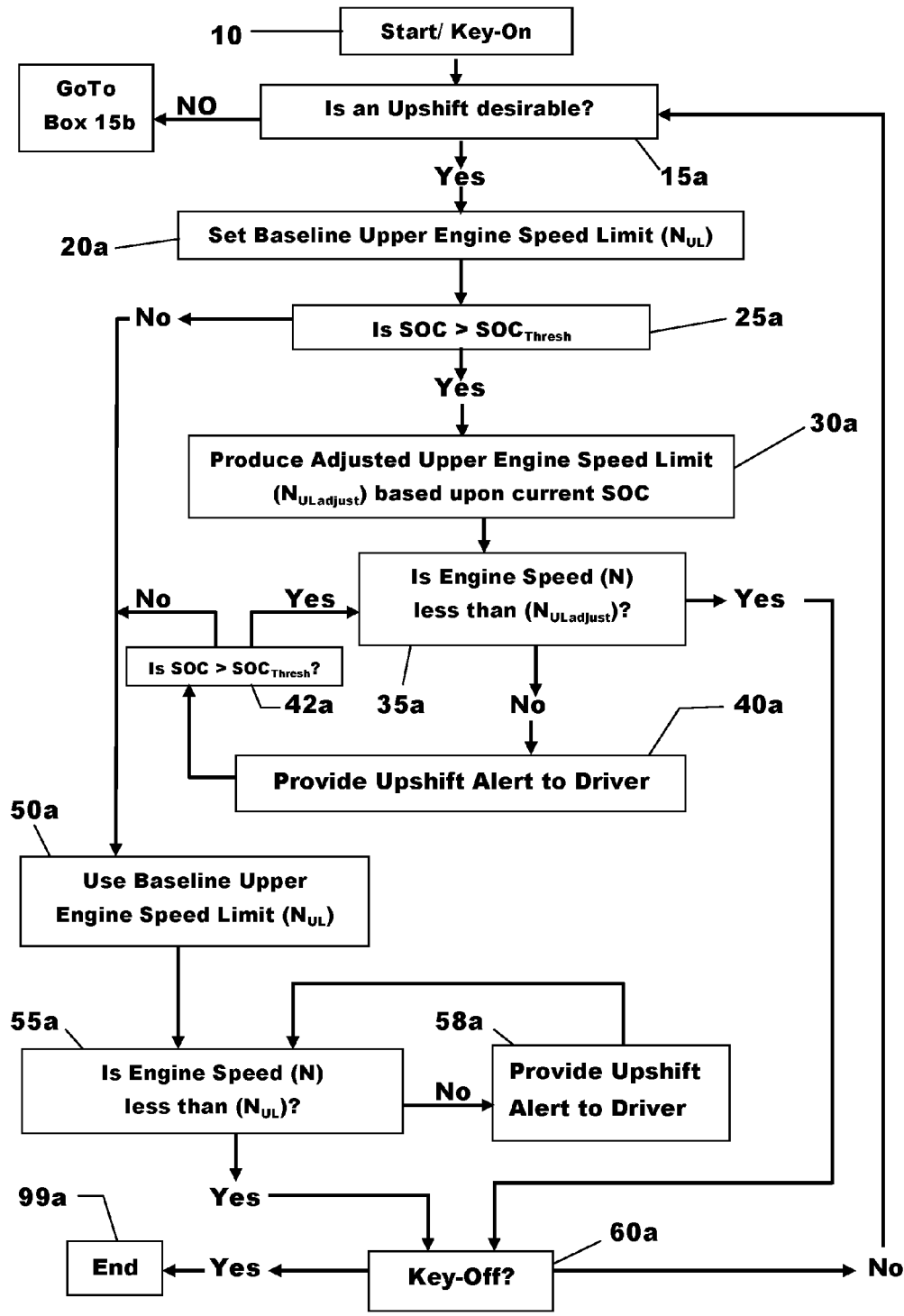
FIG. 1A is a high level flow chart of an upshift part of a method for reducing the fuel consumption of an engine of a hybrid vehicle in accordance with a first aspect of the invention.
Figure 1B:
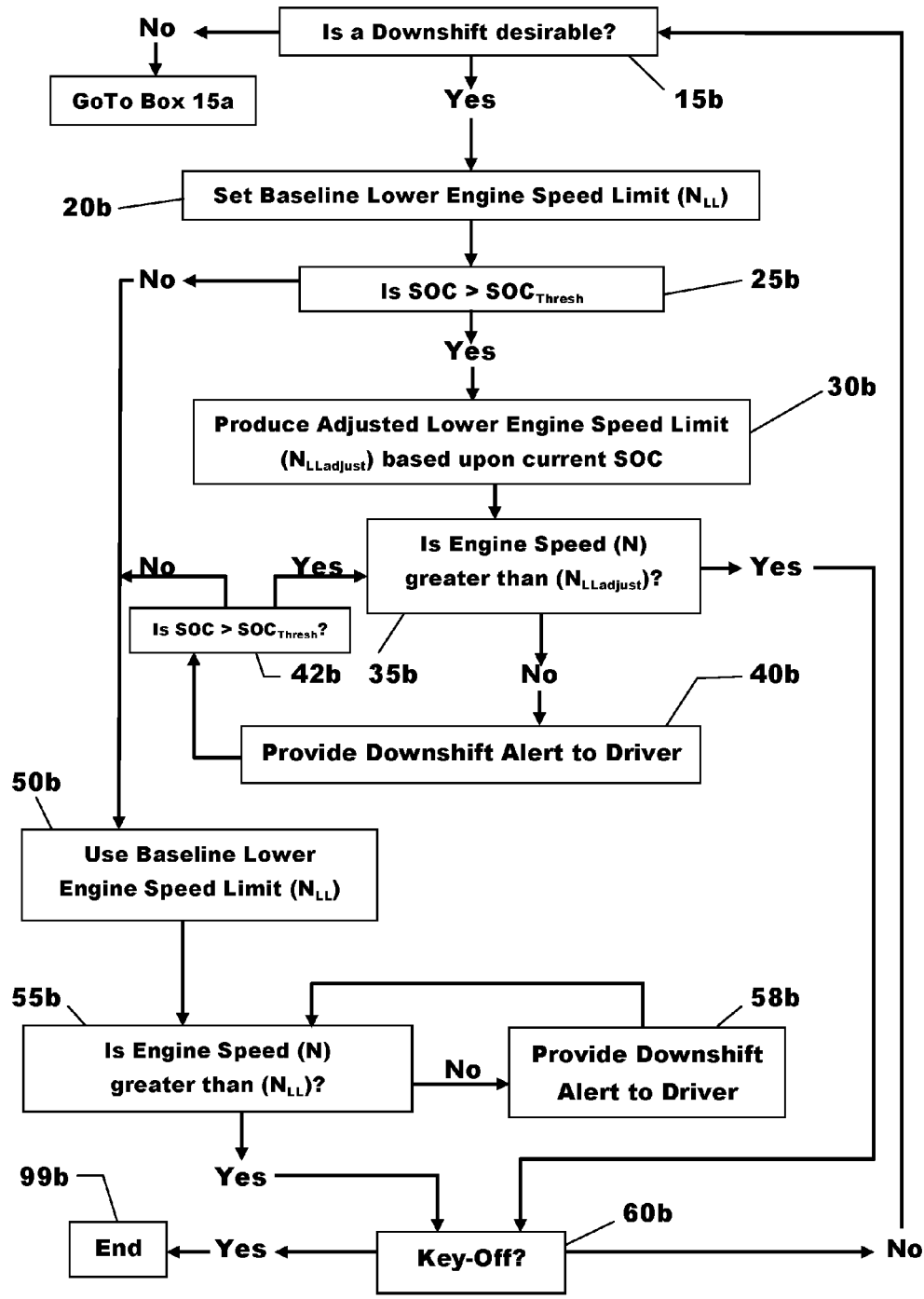
FIG. 1B is a high level flow chart of a downshift part of the method for reducing the fuel consumption of an engine of a hybrid vehicle in accordance with the first aspect of the invention.

With reference to FIGS. 1A and 1B the method for reducing the fuel consumption of an engine of a hybrid vehicle starts in box 10 which is a key-on event and is common to both an upshift control aspect of the method, as shown in FIG. 1A, and to a downshift control aspect of the method, as shown in FIG. 1B, both aspects forming parts of a single common method.

Referring firstly to FIG. 1A, the method advances from box 10 to box 15a where it is checked whether it is desirable to perform an upshift. If it is not desirable to perform an upshift the method advances to box 15b on FIG. 1B but if it is desirable to perform an upshift the method advances from box 15a to box 20a where a baseline upper engine speed limit ($N_{UL}$) is set. The tests in boxes 15a and 15b are provided to determine whether it is desirable to make an upshift or a downshift. The two tests of boxes 15a and 15b could be configured as a single test with three outcomes namely, an upshift is desirable, a downshift is desirable or no shift is required.

Various inputs are used to arrive at the decision as to whether an upshift, a downshift or no shift is desirable. For example and without limitation, vehicle speed, vehicle acceleration, the amount an accelerator pedal is being depressed, and the speed of the engine, can all be used to infer whether an upshift or a downshift is desirable.

In the case of a downshift, this decision is primarily dependent upon whether, at the current engine speed, a torque demand from a driver of the vehicle can be met in a satisfactory manner. Therefore, if the driver has depressed the accelerator pedal to request more torque and the resulting acceleration of the vehicle is unacceptably low, this could be used as an indication that it would be desirable to perform a downshift. Similarly, if the driver has requested more torque from the engine, but the speed of the vehicle or the speed of the engine is falling this could be used to indicate that a downshift is desirable. The test in box 15b could therefore comprise a number of parallel tests each defining a vehicle or engine state that indicates a downshift is desirable.

For example and without limitation:

If [(Test A=Pass) OR (Test B=Pass) OR (TestC=Pass)] THEN a Downshift is desirable ELSE check whether an upshift is desirable, where the tests A to C are configured such that a 'Pass' indicates that it is desirable to perform a downshift.

In the case of an Upshift, this decision is primarily dependent upon whether, if an upshift were to be made, the response of the motor vehicle to a torque request from the driver would be acceptable and whether the current speed of the engine is such that a reduction in engine speed would result in a saving of fuel. Therefore the test in box 15a could use modelled engine performance to decide whether an upshift is desirable.

For example and without limitation, knowing the ratio for the next higher gear and the current engine speed or current road speed, it could be calculated what the resulting engine speed would be if an upshift were to be performed. It is then possible to derive a predicted value of torque that could be obtained from the engine if it were to be operating at that speed for a given torque request from a driver. A predicted acceleration for the vehicle could be derived using the value of predicted torque and an estimate of vehicle mass obtained either from previous acceleration events or using a prediction of vehicle mass and, if the value of predicted acceleration is unacceptably low ($a<a_{min}$), this would indicate that an upshift is not desirable.

Using modelled data or test data it can be ascertained whether fuel would be saved ($SFC_{newgear} < SFC_{currentgear}$) if the engine were to be operating at a lower speed than it currently is operating. These two factors could be combined to decide whether an upshift is desirable. For example:

IF [(a is less than $a_{min}$) AND ($SFC_{newgear}$ is less than $SFC_{currentgear}$)] THEN an upshift is desirable ELSE check whether a downshift is desirable, where:

a=predicted acceleration of vehicle;

$a_{min}$=minimum acceptable acceleration of vehicle;

$SFC_{newgear}$=the mass of fuel used per unit time in new gear; and $SFC_{currentgear}$=the mass of fuel used per unit time in current gear.

It will be appreciated that the above tests are only examples of the type of test that could be used in boxes 15a and 15b and that other types of test could be used.

In all cases the object of these tests is to establish whether changing up or down would likely reduce the fuel consumption of the engine without significantly affecting the response of the motor vehicle to a torque request from the driver or produce unacceptable driveline vibrations.

In addition to the tests set out in boxes 15a and 15b, it will also be appreciated that there could be a test to check whether the highest gear ratio is currently engaged or whether the lowest gear ratio is currently engaged. If the highest gear ratio is currently engaged the method will always, irrespective of whether the engine is speeding up or decelerating, default to the steps indicated by the boxes shown on FIG. 1B. Conversely, if the lowest gear ratio is currently engaged the method will, irrespective of whether the engine is speeding up or decelerating, always default to the steps indicated by the boxes shown on FIG. 1A.

Referring back to box 20a, the baseline upper engine speed limit ($N_{UL}$) corresponds to the engine speed limit that would be set if the motor vehicle was a conventional motor vehicle and not a hybrid motor vehicle. As part of the setting process, the current gear is known, the difference in ratio between the current gear and the next higher gear is known, and the relationships between engine speed and torque, engine speed and specific fuel consumption, and torque required to prevent lugging are known. Therefore a value can be derived for the engine speed that will minimize the use of excess fuel but will enable sufficient torque to be available after the upshift has taken place for the motor vehicle to accelerate smoothly without producing lugging. It will be appreciated that if the engine speed after the upshift is too low then the driver is likely to demand a larger amount of torque than can be produced resulting in excess fuel being used and lugging.

Returning to box 20a, after the baseline upper engine speed limit has been set in box 20a, the method advances to box 25a to check whether the state of charge (SOC) of a battery is above a predefined limit ($SOC_{Thresh}$). The battery is arranged to provide electrical power to a BISG when the BISG is operating as a motor, or to be charged by the BISG when the BISG is operating as a generator.

If the SOC of the battery is below the SOC limit or threshold ($SOC_{Thresh}$), there will be insufficient charge available to permit the BISG to be used for a sufficient length of time as a motor to provide a useful torque assist to the engine of the motor vehicle. Therefore, if the current state of charge of the battery is below the state of charge limit ($SOC_{Thresh}$) the method advances from box 25a to box 50a where the baseline upper engine speed limit ($N_{UL}$) is selected as the test value for use in box 55a. That is to say, because the engine must provide sufficient torque on its own, the same engine speed limit ($N_{UL}$) is used as would be used for a conventional motor vehicle having no torque assist.

In box 55a the current engine speed is compared to the currently set engine upper speed limit ($N_{UL}$) to determine whether an upshift would be beneficial in respect of optimizing fuel usage. If the engine speed (N) is less than the currently set baseline engine upper speed limit ($N_{UL}$) then the engine is operating efficiently and an upshift into a higher gear is not currently required. In such a case the method advances from box 55a to box 60a where it is checked whether a key-off event has occurred and, if a key-off event has occurred, the method ends in box 99. However, if there has not been a key-off event when checked in box 60a the method returns from box 60a to box 15a.

It will be appreciated that whenever a key-off event occurs the method will end irrespective of the method step that is currently being executed.

Returning to box 55a, if the engine speed (N) is not less than the currently set baseline engine upper speed limit ($N_{UL}$) then the engine is not operating as efficiently as it could and an upshift into a higher gear is required. In such a case the method advances from box 55a to box 58a to alert the driver that an upshift is required in order to optimize fuel economy. The driver can be alerted in various ways such as, for example, an audible alert such as a buzzer or voice message or a visual alert such as, for example, the illumination of an upshift light, a message displayed on a display screen or a haptic signal such as causing the accelerator pedal to vibrate.

The alert could have two stages, an initial continuous illumination of an upshift light and then, if the driver has not responded to the initial alert within a short predefined period of time such as, for example, 5 seconds, either flashing the upshift light or sounding a buzzer with the continued illumination of the upshift light.

From box 58a the method returns to box 55a to recheck whether the current engine speed is still above the currently set baseline engine upper speed limit ($N_{UL}$) indicating that an upshift would be beneficial in respect of optimizing fuel usage. If the current engine speed (N) is equal to or above the currently set baseline engine upper speed limit ($N_{UL}$) then the method returns to box 58a. That is to say, so long as the current engine speed (N) is equal to or above the currently set baseline engine upper speed limit ($N_{UL}$) the alert or warning of the need to perform an upshift continues to be provided in box 58a.

It will be appreciated that, if the engine slows so that the result of the check in box 55a changes from "No" to "Yes" then the alert will be cancelled.

Therefore, as soon as the engine speed (N) is less than the currently set baseline engine upper speed limit ($N_{UL}$) indicating that an upshift into a higher gear is not currently required, the method advances from box 55a to box 60a where it is checked whether a key-off event has occurred and, if a key-off event has occurred, the method ends in box 99. However, if there has not been a key-off event when checked in box 60a the method returns from box 60a to box 15a.

Returning to box 25a, if the SOC of the battery is above the SOC limit or threshold ($SOC_{Thresh}$) then there is sufficient charge available to permit the BISG to be used for a sufficient length of time as a motor to provide a useful torque assist to the engine of the motor vehicle and the method advances from box 25a to box 30a.

In box 30a an adjusted upper engine speed limit ($N_{ULadjust}$) is selected as the test value for use in box 35a based upon the torque boosting capacity of the BISG and the actual value of SOC of the battery. That is to say, because the engine no longer has to provide sufficient torque on its own, an adjusted engine upper speed limit ($N_{ULadjust}$) can be used. This adjusted engine speed limit ($N_{ULadjust}$) takes into account that after the upshift has taken place the torque from the BISG can be used to assist the engine in driving the motor vehicle thereby allowing the transmission to be changed into a higher gear sooner than would otherwise be the case without risking lugging or unacceptably slow acceleration when the higher gear becomes operative.

This adjusted engine upper speed limit ($N_{ULadjust}$) is lower than the baseline engine upper speed limit ($N_{UL}$) because it is able to take into account the torque that can be provided from the BISG after the upshift has taken place. Therefore:

$$N_{ULadjust} = N_{UL} - N_{assist}$$

where: $N_{assist}$ is a speed value adjustment calculated from the torque that can be added from the BISG and will depend upon the relationship between torque and engine speed at low engine speeds.

For example and without limitation, assuming:
a) transmission ratios for a five speed transmission are:
   $1^{st}$=3.67:1;
   $2^{nd}$=2.14:1;
   $3^{rd}$=1.45:1;
   $4^{th}$=1.03:1; and
   $5^{th}$=0.81:1
b) if the engine is required to produce 150 Nm of torque after the upshift has taken place in order to avoid lugging and the engine speed required to produce this torque is 2000 RPM;
c) the BISG is able to provide a torque assist of 50 Nm, after the upshift has taken place thereby requiring the engine to supply only 100 Nm of torque;
d) the engine can supply 100 Nm of torque at 1750 RPM; and
e) the upshift is from $3^{rd}$ to $4^{th}$ gear.

Then for an unassisted upshift the engine speed required before the upshift would be (1.45/1.03)*2000=2816 RPM and so the baseline upper engine speed limit ($N_{UL}$) would be 2816 RPM.

However in the case where the SOC of the battery is greater than the SOC threshold ($SOC_{Thresh}$) thereby permitting the BISG to be used to provide a torque assist, the engine speed required before the upshift would be (1.45/1.03)*1750=2464 RPM and so the adjusted upper engine speed limit ($N_{ULadjust}$) would be 2464 RPM and the value of $N_{assist}$=352 RPM. That is to say $N_{assist}$ in this case is equal to (2000−1750)*(1.45/1.03).

In box 35a the current engine speed is compared to the currently set adjusted engine upper speed limit ($N_{ULadjust}$) to determine whether an upshift would be beneficial in respect of optimizing fuel usage. If the engine speed (N) is less than the currently set adjusted engine upper speed limit ($N_{ULadjust}$), then the engine is operating efficiently and an upshift into a higher gear is not currently required. In such a case the method advances from box 35a to box 60a and, provided a key-off event has not occurred, the method returns to box 15a because there is currently no need for the driver to make an upshift. If a key-off event has occurred when tested in box 60a the method ends in box 99a.

Returning now to box 35a, if the engine speed (N) is not less than the currently set adjusted engine upper speed limit ($N_{ULadjust}$) then the engine is not operating as efficiently as it could and an upshift into a higher gear is required. In such a case the method advances from box 35a to box 40a as indicated by the "No" arrows to alert the driver that an upshift is required in order to optimize fuel economy. As before, the driver can be alerted in various ways such as, for example, an audible alert such as a buzzer or voice message or a visual alert such as, for example, the illumination of an upshift light or a message displayed on a display screen.

From box 40a the method advances to box 42a where it is checked whether the current state of charge (SOC) is still above the required threshold limit ($SOC_{Thresh}$). It will be appreciated that normally the current state of charge (SOC) of the battery will not normally reduce significantly but this test is an extra check just to ensure that there is sufficient charge in the battery to provide a torque boost when the upshift is finally made. Therefore in most cases the method will cycle through boxes 35a, 40a, 42a until an upshift occurs at which time the result of the test in box 35a will change from "No" to "Yes", the alert will be cancelled and the method will advance from box 35a to box 60a as previously described.

Therefore the alert indicated in box 40a will continue to be provided so long as the driver maintains the transmission in a lower gear than suggested and the state of charge of the battery remains above the state of charge threshold ($SOC_{Thresh}$).

If the state of charge test in box 42a is failed then the method advances to box 50a because in such circumstances the engine must act alone as torque boosting is not possible. The alert indicated in box 40a will then be replaced by the alert provided in box 58a so long as the driver maintains the transmission in a lower gear than suggested which is now based on the baseline engine upper speed limit ($N_{UL}$).

Referring now to FIG. 1B relating to a downshift scenario, if an upshift is not desirable when tested for in box 15a the method advances from box 15a to box 15b where it is tested whether a downshift is desirable. If a downshift is not desirable, the method returns to box 15a and the method will cycle between these two boxes 15a, 15b until one of the conditions becomes valid.

If a downshift is desirable when tested in box 15b the method will advance from box 15b to box 20b where a baseline lower engine speed limit ($N_{LL}$) is set. This limit corresponds to the limit that would be set if the motor vehicle was a conventional motor vehicle and not a hybrid motor vehicle. As part of the setting process the relationships between engine speed and torque, engine speed and specific fuel consumption and lugging limit are known.

Therefore a value can be derived for the engine speed that will minimise the use of excess fuel but provides sufficient torque to be available before the downshift has taken place for the motor vehicle to accelerate smoothly if required from that engine speed without producing lugging.

After the baseline upper engine speed limit has been set in box 20b, the method advances to box 25b to check whether the state of charge (SOC) of a battery is above a predefined limit ($SOC_{Thresh}$). The battery is used to provide electrical power to a BISG when the BISG is operating as a motor or to be charged by the BISG when the BISG is operating as a generator.

If the SOC of the battery is below the SOC limit or threshold ($SOC_{Thresh}$) then there will be insufficient charge available to permit the BISG to be used for a sufficient length of time as a motor to provide a useful torque assist to the engine of the motor vehicle.

Therefore, if the current state of charge of the battery is below the state of charge limit ($SOC_{Thresh}$) the method advances from box 25b to box 50b where the baseline lower engine speed limit ($N_{LL}$) is selected as the test value for use in box 55b. That is to say, because the engine must provide sufficient torque on its own, the same engine speed limit ($N_{LL}$) is used as would be used for a conventional motor vehicle having no torque assist.

In box 55b the current engine speed is compared to the currently set baseline engine lower speed limit ($N_{LL}$) to determine whether a downshift would be beneficial in respect of optimising fuel usage and to prevent lugging from occurring. If the engine speed is allowed to fall below the currently set engine lower speed limit ($N_{LL}$) then the engine will likely be unresponsive if a driver requests more torque and so the driver will likely depress the accelerator more in an attempt to increase the available torque. This will result in fuel being wasted and will potentially result in lugging.

If when checked in box 55b the engine speed (N) is higher than the currently set baseline engine lower speed limit ($N_{LL}$), the engine is operating efficiently and a downshift into a lower gear is not currently required. In such a case the method advances from box 55b to box 60b where it is checked whether a key-off event has occurred and, if a key-off event has occurred, the method ends in box 99. If there has not been a key-off event when checked in box 60b, the method returns from box 60b to box 15b.

It will be appreciated that whenever a key-off event occurs the method will end irrespective of the method step that is currently being executed.

Returning to box 55b, if the engine speed (N) is not greater than the currently set baseline engine lower speed limit ($N_{LL}$) then the engine is not operating as efficiently as it could and a downshift into a lower gear is required. In such a case the method advances from box 55b to box 58b to alert the driver that a downshift is required in order to optimise fuel economy and minimise vibration harshness. The driver can be alerted in various ways such as, for example, an audible alert such as a buzzer or voice message or a visual alert such as, for example, the illumination of an upshift light, a haptic signal or a message displayed on a display screen.

The alert could have two stages, an initial continuous illumination of a downshift light and then, if the driver has not responded to the initial alert within a short predefined period of time such as, for example, 5 seconds, either flashing the downshift light, changing the colour of the light from say green to orange or sounding a buzzer with the continued illumination of the downshift light.

From box 58b the method returns to box 55b to recheck the current engine speed (N) against the currently set baseline engine lower speed limit ($N_{LL}$) and will cycle through the boxes 55b and 58b until the current engine speed (N) is greater than the currently set baseline engine lower speed limit ($N_{LL}$) indicating that a downshift has occurred. Therefore the alert or warning given in box 58b will continue until the driver effects or performs a downshift.

When a downshift is made the engine speed will rise and so the test in box 55b will be passed and the method advances to box 60b where it is checked whether a key-off event has occurred and, if it has, the method ends in box 99. However, if there has not been a key-off event when checked in box 60b, the method will return from box 60b to box 15b.

Returning to box 25b, if the SOC of the battery is above the SOC limit or threshold ($SOC_{Thresh}$) then there is sufficient charge available to permit the BISG to be used for a sufficient length of time as a motor to provide a useful torque assist to the engine of the motor vehicle.

Therefore, if the current state of charge of the battery is above the state of charge limit ($SOC_{Thresh}$) the method advances from box 25b to box 30b where an adjusted lower engine speed limit ($N_{LLadjust}$) is set as the test value for use in box 35b. That is to say, because the engine no longer has to provide sufficient torque on its own, an adjusted engine lower speed limit ($N_{LLadjust}$) can be used. This adjusted engine speed limit ($N_{LLadjust}$) takes into account that the torque from the BISG can be used to assist the engine in driving the motor vehicle thereby allowing the transmission to be changed into a lower gear later than would otherwise be the case without risking lugging or unacceptably slow acceleration when the higher gear becomes operative.

This adjusted engine lower speed limit ($N_{LLadjust}$) is lower than the baseline engine lower speed limit ($N_{LL}$) because it is able to take into account the torque that can be provided from the BISG after the upshift has taken place.

Therefore $$N_{LLadjust} = N_{LL} - N_{assist}$$

where: $N_{assist}$ is a speed value adjustment calculated from the torque that can be added from the BISG and will depend upon the relationship for the engine between torque and engine speed.

For example and without limitation, assuming:
a) that the engine is required to produce 110 Nm of torque in order to avoid lugging and to be sufficiently responsive to demands for acceleration and the engine speed required to produce this torque is 1800 RPM;
b) the BISG is able to provide a torque assist of 50 Nm, thereby requiring the engine to supply only 60 Nm of torque;
c) the engine can supply 60 Nm of torque at 1550 RPM; and
d) the current gear ratio is $3^{rd}$ gear.

That is to say $N_{assist}$ in this case is equal to (1800−1550)= 250 RPM and the engine speed can be allowed to drop 250 RPM lower using torque assist than it would otherwise be advisable.

Therefore, using the previously provided gear ratios, for an unassisted downshift from $3^{rd}$ to $2^{nd}$, the engine speed in $2^{nd}$ gear using the previously referred to gear ratios would be (2.14/1.45)*1800=2657 RPM whereas for a torque assisted downshift the engine speed in $2^{nd}$ would be (2.14/1.45)* 1550=2288 RPM a useful reduction of 369 RPM in $2^{nd}$ gear.

In box 35b the current engine speed is compared to the currently set adjusted engine lower speed limit ($N_{LLadjust}$) to determine whether a downshift would be beneficial in respect of optimizing fuel usage and reducing vibration harshness. If the engine speed (N) is greater than the currently set adjusted engine upper speed limit ($N_{LLadjust}$) then the engine is operating efficiently and a downshift into a lower gear is not currently required. In such a case the method advances from box 35b to box 60b and, provided there is not a key-off event, the method returns to box 15b because there is currently no need for the driver to effect or perform a downshift.

Returning to box 35b, if the engine speed (N) is equal to or less than the currently set adjusted engine lower speed limit ($N_{LLadjust}$) then the engine is not operating as efficiently as it could be and a downshift into a lower gear is required. In such a case the method advances from box 35b to box 40b as indicated by the "No" arrows to alert the driver that a downshift is required in order to optimize fuel economy. As before, the driver can be alerted in various ways such as, for example, an audible alert such as a buzzer or voice message or a visual alert such as, for example, the illumination of an upshift light, a haptic signal or a message displayed on a display screen.

From box 40b the method advances to box 42b where it is checked whether the current state of charge (SOC) is still above the required threshold limit ($SOC_{Thresh}$). It will be appreciated that the current state of charge (SOC) of the battery will be reduced if the BISG is being used for a significant period of time due to a failure of the driver to make a downshift when requested to do so. This test checks to ensure that there is sufficient charge remaining in the battery to continue providing a torque boost before the downshift is finally made.

In most cases the method will cycle through boxes 35a, 40a, 42a until a downshift occurs at which time the result of the test in box 35b will change from "No" to "Yes", the alert will be cancelled and the method will advance from box 35a to box 60a as previously described and the method will advance via box 60b to box 15b unless a key-off event has occurred.

However, if when checked in box 42b, the current state of charge of the battery (SOC) falls below the state of charge threshold ($SOC_{Thresh}$), the method advances to boxes 50b and 55b and the alert indicated in box 40b will then be replaced by the alert provided in box 58b so long as the driver maintains the transmission in a higher gear than suggested which is now an engine speed based on the baseline engine lower speed limit ($N_{LL}$).

Although the embodiments of the invention have been so far described as provided to reduce the fuel consumption of a hybrid motor vehicle having a transmission in which the various ratios are manually selected by the driver and so the means for improving the fuel economy of the motor vehicle is by alerting the driver that a change in ratio either an upshift or a downshift is required by any suitable means it will be appreciated that it could be applied to a hybrid vehicle having an fully automatic transmission. In such a case, instead of upshift and downshift alerts being advised to the driver, the shift pattern for the transmission would be modified based upon whether the tests given in boxes 25a and 25b are passed or failed. If the tests are passed then the shift pattern is adjusted so as to effect an upshift at a lower engine speed and to effect a downshift at a lower engine speed than otherwise would be considered suitable. However, if the test present in box 25a or box 25b is failed, the shift pattern remains unadjusted and so will remain at a baseline value.

Furthermore, the driver alerting shown in boxes 40a, 58a, 40b and 58b would, in the case of a fully automatic transmission, be replaced with an actual change in gear ratio up or down respectively based upon the adjusted shift pattern.

Figure 2:
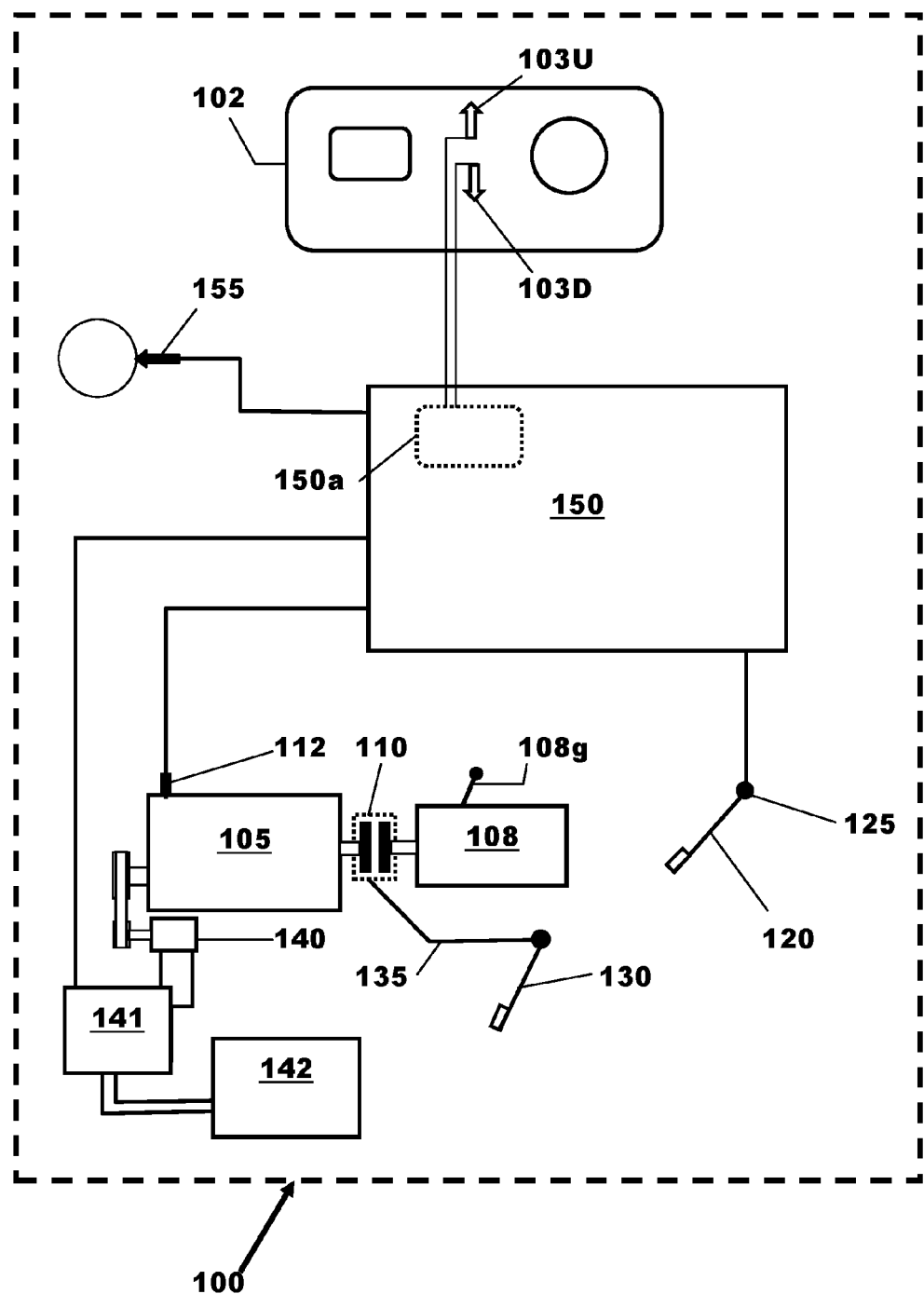
FIG. 2 is a schematic diagram of a hybrid vehicle having a multispeed transmission in accordance with a second aspect of the invention.

With reference to FIG. 2 there is shown a motor vehicle 100 having an instrument panel 102, an engine 105 driving a manual transmission 108 via a clutch 110, an electric machine such as a belt integrated starter generator (BISG) 140 drivingly connected to the engine 105 and electrically connected to a source of electrical energy in the form of a battery 142, a BISG controller 141 and an electronic control system 150 to control various functions of the motor vehicle 100.

It will be appreciated that the term 'battery' as meant herein is not limited to a single battery. The term 'battery' therefore includes a battery pack in which several separate batteries are connected together to form a source of electrical energy. It will be appreciated that the electric machine can be any electrical device that can be operated either as a motor or as a generator and there is no requirement for the electric machine to be used for starting of the engine 105.

The instrument panel 102 includes a 'GSI' in the form of an upshift indicator light 103U and a downshift indicator light 103D that are used to assist in reducing the fuel consumption of the motor vehicle 100.

The clutch 110 is manually controlled by a clutch pedal 130 that is connected to the clutch 110 via a clutch linkage 135. It will be appreciated that the clutch linkage 135 can be of any suitable type such as, for example, a mechanical linkage, a hydraulic linkage or an electrically operated linkage (e-clutch) or a combination of any of these.

The transmission 108 is in the case of this embodiment a manually operated transmission having a number of gear ratios selectable by the driver of the motor vehicle 100 by means of a gear lever 108g. However, the invention is also applicable to other types of transmission where the driver is in direct control of the selection of the various ratios by the movement of an input device such as, for example, a gear stick, a gear lever, steering wheel paddles or other input device such as, for example and without limitation, the transmission shown in U.S. Pat. No. 5,070,740 and also to fully automatic transmissions having no manual control of gear changes.

The BISG controller 141 controls the operation of the BISG 140 as either a motor or as a generator and also monitors the state of charge of the battery 142.

The electronic control system 150 includes a number of control modules of which only a GSI control module 150a used for controlling the illumination of the upshift indicator light 103U and the downshift indicator light 103D is shown.

The electronic control system 150 receives in this case a first input from an engine speed sensor 112, a second input from an accelerator pedal position sensor 125 associated with an accelerator pedal 120, a third input from a vehicle road speed sensor 155 and a fourth input from the BISG controller 141.

It will be appreciated that various other inputs could be provided to the electronic control system such as, for example, inputs relating to the current operating state of the engine 105.

It will be appreciated that the currently selected gear could be provided by means of one or more sensors associated with the transmission 108 but, in this case, is inferred from the relationship between engine speed and road speed as measured by the engine speed sensor 112 and the road speed sensor 155. As yet another alternative, the currently selected gear could be provided from a transmission controller if the transmission is an automatic transmission.

The GSI module 150a is operable to control the illumination of the upshift indicator light 103U and the downshift indicator light 103D in order to optimise fuel economy and thereby reduce the amount of fuel used by the engine 105.

The electronic control system 150 is therefore operable to execute the method as shown and described with reference to FIGS. 1a and 1b.

Therefore, during use of the motor vehicle 100, if the SOC of the battery is sufficiently high to permit the use of the BISG 140 to provide a torque boost to the engine 105, the engine speeds at which the upshift indicator light 103U and the downshift indicator light 103D are adjusted to take into account the availability of this torque boost. This will result in both cases in a reduction of the engine speed at which the alert will be provided.

Therefore the motor vehicle 100 can operate at a lower engine speed in a particular gear before a downshift is signalled via the downshift indicator light 103D and is required to change into a higher gear at a lower engine speed when signalled via the upshift indicator light 103U.

It will be appreciated that the means of alerting the driver need not be upshift and downshift lights other means could be used such as messages on a visual display or audible warnings such as a buzzer, haptic signal or a pre-recorded voice message.

It will also be appreciated that the alert could have more than one level of alert such as changing the warning from a constant illumination of a light to a flashing light or by changing the colour of the light from say green to orange or another suitable colour.

It will be appreciated that the invention is not limited to transmissions having meshing gears and that the terms upshift into a higher gear or downshift into a lower gear could be replaced by the terms upshift into a numerically lower ratio or downshift into a numerically higher ratio.

It will also be appreciated that the values of adjusted upper and lower engine speed limits need not be fixed values but could be adaptive and vary based upon the actual level of the SOC of the battery 142 at the time of the change in gear. That is to say, if the SOC is very high a greater reduction in engine speed can be used than if the SOC is close to the SOC limit or threshold $SOC_{Thresh}$.

It will be appreciated that the adjusted upper and lower engine speed limits could be used to modify the up and down shift points for a fully automatic transmission based upon the state of charge of the battery rather than vary the speed at which a GSI warning is provided.

It will be appreciated by those skilled in the art that although the invention has been described by way of example with reference to one or more embodiments it is not limited to the disclosed embodiments and that alternative embodiments could be constructed without departing from the scope of the invention as defined by the appended claims. While exemplary embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A method for controlling a hybrid vehicle having a battery, and an engine selectively coupled to a multi-speed transmission having discrete gear ratios, comprising:

initiating, by a controller, a gear shift of the multi-speed transmission responsive to speed of the engine exceeding a first engine speed threshold if a battery state of charge (SOC) is above an (SOC) threshold, and exceeding a second engine speed threshold if the battery state of charge is not above the SOC threshold.

2. The method of claim 1, the battery state of charge threshold being based upon whether the state of charge of the battery is sufficient to permit an electric machine to be used to provide a temporary torque boost to the engine of the hybrid vehicle.

3. The method of claim 1, the first engine speed threshold being less than the second engine speed threshold.

4. The method of claim 1, wherein the gear shift is an upshift to a higher gear and the first engine speed threshold is an engine upper speed limit for the engine when using a current gear ratio.

5. The method of claim 1, the multi-speed transmission comprising a transmission in which a driver manually effects changes in gear ratio and wherein initiating the gear shift comprises generating an alert to the driver to upshift the transmission.

6. The method of claim 1, the multi-speed transmission comprising an automatic transmission having discrete gear ratios, wherein initiating the gear shift comprises automatically upshifting the automatic transmission when the engine speed becomes greater than the first engine speed threshold.

7. The method of claim 1, wherein the gear shift is a downshift to a lower gear and the first engine speed threshold is an engine lower speed limit for the engine when using a current gear ratio.

8. A hybrid vehicle comprising:
an engine;
a battery coupled to an electric machine;
a multi-speed transmission, having discrete gear ratios, coupled to the engine; and
a controller programmed to generate a gear shift signal for the multi-speed transmission in response to speed of the engine changing from below to not below, or changing from above to not above, an engine speed threshold that is based on a state of charge of the battery.

9. The vehicle of claim 8, the controller further programmed to generate a transmission upshift signal in response to engine speed exceeding the engine speed threshold and the state of charge of the battery exceeding a state of charge threshold.

10. The vehicle of claim 9, the engine speed threshold being lower than a baseline threshold in response to the state of charge of the battery exceeding the state of charge threshold.

11. The vehicle of claim 8, the multi-speed transmission comprising a manual transmission wherein generating the gear shift signal comprises energizing a gear shift indicator.

12. The vehicle of claim 11 wherein the gear shift indicator comprises at least one of a visual indicator, a haptic indicator, and an audible indicator.

13. The vehicle of claim 8, the multi-speed transmission comprising an automatic transmission wherein generating the gear shift signal comprises controlling the automatic transmission to upshift from a lower one of the gear ratios to a higher one of the gear ratios when the engine speed exceeds the engine speed threshold and the state of charge of the battery exceeds a state of charge threshold, the engine speed threshold being less than a baseline engine speed threshold corresponding to the state of charge of the battery being below the state of charge threshold.

14. The vehicle of claim 8, the electric machine comprising an integrated starter-generator.

15. The vehicle of claim 14 wherein the integrated starter-generator comprises a belt integrated starter-generator driveably connected via a drive belt to a crankshaft of the engine.

16. A hybrid vehicle having an engine, an electric machine, a battery, and a multi-speed transmission with discrete gear ratios, comprising:
  a processor programmed to control upshifting of the transmission responsive to speed of the engine exceeding a first upshift threshold associated with the battery being above a threshold state of charge, and exceeding a second upshift threshold higher than the first upshift threshold associated with the battery not being above the threshold state of charge.

17. The hybrid vehicle of claim 16, the processor further programmed to control shifting of the transmission in response to the speed of the engine becoming greater than or less than one of a first downshift threshold associated with the battery being below the threshold state of charge, and a second downshift threshold lower than the first downshift threshold associated with the battery not being below the threshold state of charge.

18. The hybrid vehicle of claim 17, the processor programmed to generate a transmission downshift signal in response to the engine speed being below the first downshift threshold.

19. The hybrid vehicle of claim 16, the electric machine comprising an integrated starter-generator.

20. The hybrid vehicle of claim 16, the multi-speed transmission is an automatic transmission wherein to control upshifting comprises controlling the automatic transmission to upshift from a lower one of the gear ratios to a higher one of the gear ratios.

* * * * *